(12) United States Patent
Khattab et al.

(10) Patent No.: US 9,768,992 B2
(45) Date of Patent: Sep. 19, 2017

(54) SYSTEM AND METHOD FOR RANDOMIZED ANTENNA ALLOCATION IN ASYNCHRONOUS MIMO MULTI-HOP NETWORKS

(75) Inventors: Ahmed Khattab, Houston, TX (US); Ashutosh Sabharwal, Houston, TX (US); Edward W. Knightly, Houston, TX (US)

(73) Assignee: William Marsh Rice University, Houston, TX (US)

( * ) Notice: Subject to any disclaimer, the term of this patent is extended or adjusted under 35 U.S.C. 154(b) by 270 days.

(21) Appl. No.: 12/132,927

(22) Filed: Jun. 4, 2008

(65) Prior Publication Data
US 2009/0304096 A1 Dec. 10, 2009

(51) Int. Cl.
*H04L 27/00* (2006.01)
*H04B 7/0413* (2017.01)
*H04B 7/06* (2006.01)
*H04B 7/08* (2006.01)

(52) U.S. Cl.
CPC ........... *H04L 27/00* (2013.01); *H04B 7/0413* (2013.01); *H04B 7/0691* (2013.01); *H04B 7/0874* (2013.01)

(58) Field of Classification Search
CPC .. H04B 7/0413; H04B 7/0874; H04B 7/0691; H04L 27/00; H04W 72/0406; H04W 28/24; H04W 72/082
USPC ....... 375/224, 247, 259, 260, 272, 332, 334, 375/340, 341; 370/208, 209, 210, 252, 370/330, 335, 338, 344; 455/39, 63.1, 455/69, 101, 509, 513
See application file for complete search history.

(56) References Cited

U.S. PATENT DOCUMENTS

| | | | |
|---|---|---|---|
| 6,879,840 B2 * | 4/2005 | Razavilar et al. | 455/522 |
| 2003/0161268 A1 * | 8/2003 | Larsson et al. | 370/229 |
| 2003/0198204 A1 * | 10/2003 | Taneja et al. | 370/332 |
| 2006/0291591 A1 * | 12/2006 | Ghosh | H04L 1/203 375/340 |
| 2007/0093209 A1 * | 4/2007 | Agrawal et al. | 455/63.1 |
| 2007/0104215 A1 * | 5/2007 | Wang et al. | 370/458 |
| 2007/0105573 A1 * | 5/2007 | Gupta et al. | 455/509 |
| 2007/0115799 A1 * | 5/2007 | Ting et al. | 370/208 |
| 2007/0297332 A1 * | 12/2007 | Broberg | H04L 47/10 370/235 |

(Continued)

FOREIGN PATENT DOCUMENTS

DE WO 2008022969 A1 * 2/2008 ............ H04W 16/10

*Primary Examiner* — Syed Haider
(74) *Attorney, Agent, or Firm* — 24IP Law Group; Timothy R DeWitt (57) ABSTRACT

A system and method for simultaneous and asynchronous transmissions in multi-antenna multi-hop networks. The system and method employ randomized and non-greedy resource allocation to counter starvation. The system and method define a class of asynchronous random access protocols subsuming MIMO systems via two components. Residual Capacity Estimation and Randomized Resource Allocation. The system and method realize the first asynchronous MIMO MAC protocol that counters flow starvation in multi-hop networks. Randomized and non-greedy antenna allocation coupled with local residual capacity estimation results in previously-starving nodes capturing a fair share of system resources while simultaneously exploiting throughput gains available to multi-antenna systems.

26 Claims, 8 Drawing Sheets

(56) References Cited

U.S. PATENT DOCUMENTS

2007/0298822 A1* 12/2007 Wan ..................... H04L 1/1812
                                                                455/509
2009/0052405 A1*  2/2009 Ko et al. ....................... 370/335
2010/0041426 A1*  2/2010 Halfmann ............ H04W 16/10
                                                                455/509

* cited by examiner

SYSTEM AND METHOD FOR RANDOMIZED ANTENNA ALLOCATION IN ASYNCHRONOUS MIMO MULTI-HOP NETWORKS

STATEMENT REGARDING FEDERALLY SPONSORED RESEARCH OR DEVELOPMENT

The work in developing the present invention was partially supported by NSF ANI-0325971, CNS 0551692 and NSF CNS-0619767.

CROSS-REFERENCE TO RELATED APPLICATIONS

None.

BACKGROUND OF THE INVENTION

Field of the Invention

The present invention relates to a system and method for providing fairness and countering flow starvation in asynchronous wireless networks in which all nodes are not necessarily mutually within radio range, i.e., "multi-hop" wireless networks.

Brief Description of the Related Art

Figure 1A:
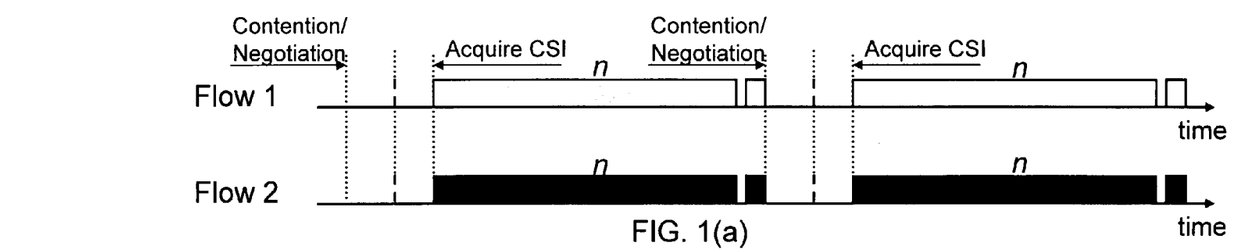
FIGS. 1(a)-(c) are timelines of the activities of 2 flows under different MAC approaches.
Figure 1B:
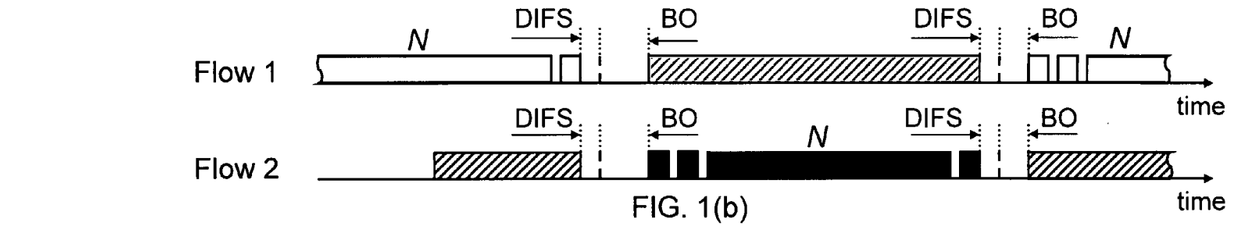

The IEEE 802.11 standard family represents the state of the art of asynchronous random access mechanisms. The standard adopts Carrier Sense Multiple Access with Collision Avoidance (CSMA/CA) at the Medium Access Control (MAC) layer and consequently targets (within a clique) having a single flow exclusively capture the medium while other flows defer their transmissions as shown in FIG. 1(b). In multi-hop networks, nodes are not within range of each other, hence, nodes have differing channel states. Such asymmetric channel states can result in a backlogged flow capturing the system resources and causing other flow(s) to persistently receive very low throughput. See M. Garetto, T. Salonidis, and E. Knightly, "Modeling per-flow throughput and capturing starvation in CSMA multi-hop wireless networks," *Proceedings of IEEE INFOCOM* '06, Barcelona, Spain, April 2006.

Figure 2A:
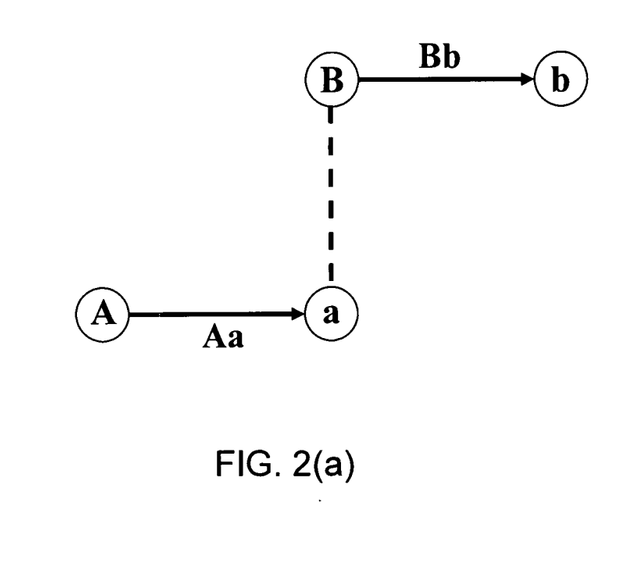
FIGS. 2(a)-(b) illustrate problematic single-hop scenarios in CSMA multi-hop networks. Nodes connected with dotted lines are within transmission range.

Consider the multi-hop topology shown in FIG. 2(a), node B, the transmitter of flow Bb, knows when to contend for the medium because it overhears the activity of flow Aa. On the other hand, node A, the transmitter of flow Aa, has no information about flow Bb and must blindly contend for the medium. The probability of successful transmission of flow Aa packets is close to zero. Similarly, the middle flow Aa in FIG. 2(b) will receive very low throughput compared to the outer flows Bb and Cc. Transmitter A will find the medium busy with high probability due to the uncoordinated transmissions of flows Bb and Cc.

The upcoming IEEE 802.11n Multiple-Input Multiple-Output (MIMO) standard promises performance gains compared to Single-Input Single-Output (SISO) systems by utilizing spatial diversity (increasing link reliability, reducing transmission power, or equivalently, extending the transmission range) or spatial multiplexing (increasing link capacity). However, because the MIMO physical layer employs CSMA/CA at the MAC layer, the 802.11n standard and its variants will suffer from the same severe unfairness and starvation problems encountered in single antenna networks. See M. Garetto, T. Salonidis, and E. Knightly, "Modeling per-flow throughput and capturing starvation in CSMA multi-hop wireless networks," *Proceedings of IEEE INFOCOM* '06, Barcelona, Spain, April 2006. Indeed, it can be shown experimentally using pre-802.11n devices that MIMO worsens unfairness in key starvation scenarios. Such CSMA/CA starvation is attributed to the asymmetric and incomplete views of the wireless channel for contending flows in multi-hop networks. Use of MIMO simply to improve the performance of individual links provides a further advantage to the winning flows.

Multiple transmit and receive antennas can also be used for beamforming (also called stream control) and interference cancellation, respectively. Thus, in contrast to the IEEE 802.11 standards, multiple simultaneous transmissions can coexist in the same channel. However, protocols employing these mechanisms require network-wide synchronization and channel information of all interfering transmitters at each receiver in order to null out their signals. See P. Casari, M. Levorato, and M. Zorzi, "DSMA: an access method for MIMO ad hoc networks based on distributed scheduling," *Proceedings of ACM IWCMC*, Vancouver, Canada, July 2006; M. Park, S.-H. Choi, and S. M. Nettles, "Cross-layer MAC design for wireless networks using MIMO," *Proceedings of IEEE Globecom* '05, December 2005; M. Park, R. J. Heath, and S. Nettles, "Improving throughput and fairness for MIMO ad hoc networks using antenna selection diversity," *Proceedings of IEEE Globecom* '04, December 2004; K. Sundaresan, R. Sivakumar, M. Ingram, and T.-Y. Chang, "A fair medium access control protocol for ad-hoc networks with MIMO links," *Proceedings of IEEE INFOCOM* '04, Hong Kong, March 2004; K. Sundaresan and R. Sivakumar, "A unified MAC framework for ad-hoc networks with smart antennas," in Proceedings of ACM Mobihoc '04, Tokyo, Japan, May 2004; R. Bhatia and L. Li, "Throughput optimization of wireless mesh networks with mimo links," *Proceedings of IEEE INFOCOM* '07, Anchorage, Ak., May 2007; and A. Ashtaiwi and H. Hassanein, "Rate splitting mimo-based mac protocol," in *Proceedings of IEEE Conference on Local Computer Networks*, Dublin, Ireland, October 2007.

While such synchronous MAC protocols address fairness by allowing multiple simultaneous transmissions, the overhead due to network synchronization and channel acquisition significantly degrades the system throughput as was empirically shown in S. Gaur, J.-S. Jiang, M. Ingram, and M. Demirkol, "Interfering MIMO links with stream control and optimal antenna selection," *Proceedings of IEEE Globecom* '04, Dallas, Tex., November 2004.

To demonstrate the existence of starvation in MIMO networks, we designed the following experiment. We utilized four laptops, each equipped with a wireless Belkin card that utilizes the Ralink RT2860 and RT2820 chipsets. The cards fully comply with the current IEEE 802.11n draft with backward compatibility with the IEEE 802.11b/g standards. The chipset embodies a 2 transmitter, 3 receiver (2T3R) architecture 1 via on-board dipole antennas with 1 dBi antenna gain. We configured the cards in the 802.11n 40 MHz mode with only 802.11b compatibility. We used iperf to generate fully backlogged UDP traffic sessions at transmitting nodes. We arranged the four nodes to form two contending transmitter-receiver pairs in 2 different indoor topologies: a fully-connected topology in which all nodes are within range of each other, and the information asymmetry topology shown in FIG. 2(a), in which the transmitter of one flow is out of range of both the sender and the receiver of the other flow.

Figure 3:
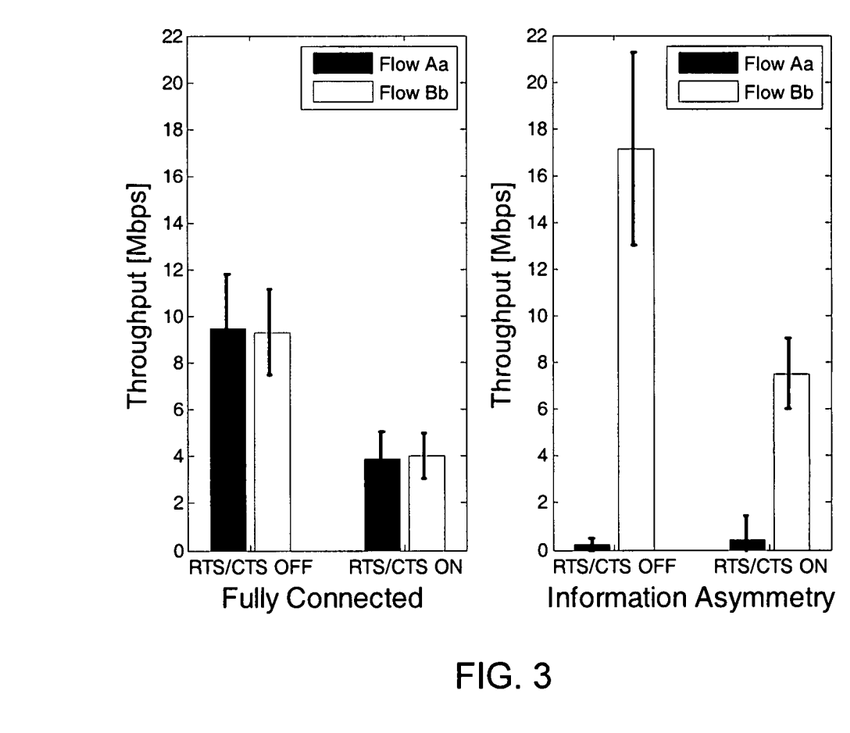
FIG. 3 are graphs illustrating the mean and variance of the flow throughput using pre-802.11n devices in two contention scenarios.
Figure 4:
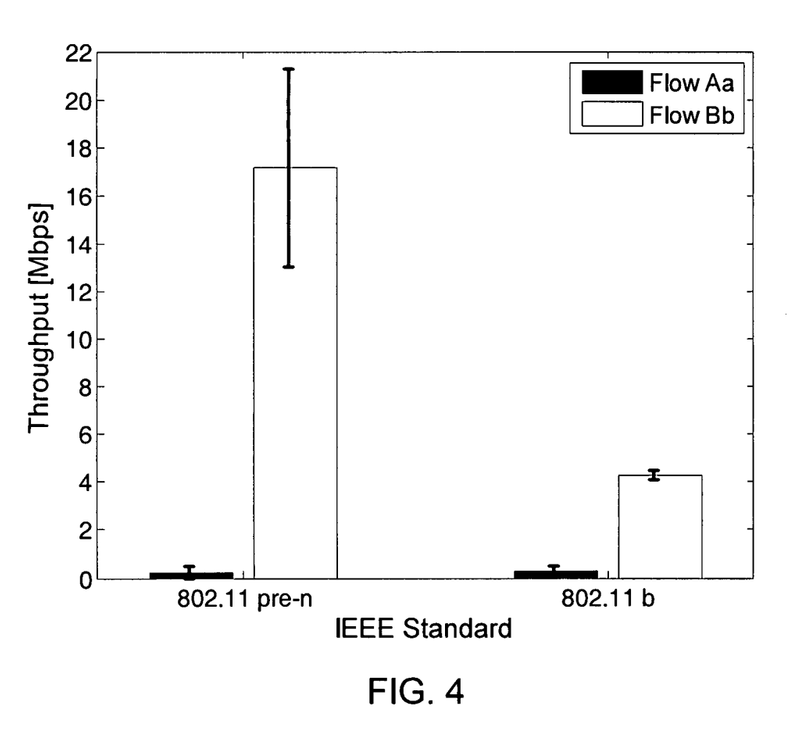
FIG. 4 is a graph illustrating how IEEE 802.11n worsens starvation in information asymmetry scenarios.

FIG. 3 depicts the throughput (averaged over 10 measurements, each of length 120 seconds) of each flow in both setups when the RTS/CTS mechanism is both disabled and enabled. While the two flows fairly shared the available bandwidth in the fully-connected scenario, one flow received 68.34 times the throughput of the other flow in 802.11n networks in the information asymmetry topology when the RTS/CTS handshake was disabled. This throughput ratio dropped to 12.14 when we repeated the same experiment with 802.11b cards, as shown in FIG. 4. Thus, MIMO worsened the severity of starvation since the flow which exclusively captured the medium transmitted at a higher rate compared to the SISO case. Enabling the RTS/CTS handshake did not alleviate starvation, but rather degraded the throughput due to the transmission of such control packets at the base rate.

SUMMARY OF THE INVENTION

The present invention exploits the antenna selection capability of multi-antenna networks to realize fair medium access among interfering flows in multi-hop networks. The method and system of the present invention prevent a flow from using all antennas for all time thereby leaving a Signal to Interference plus Noise Ratio (SINR) margin for other contending flows. In doing so it address two issues: (i) how to infer the available capacity margin based on the measured interference in the sender and the receiver's vicinity, and (ii) how to map these estimates into a non-greedy randomized antenna allocation policy that counters starvation while achieving throughput gains available to multi-antenna systems.

The present invention provides a framework for randomized resource allocation in medium access protocols. In this framework, a transmitter-receiver pair jointly estimates the surrounding network conditions and the residual capacity margin. Based on these estimates, a flow probabilistically uses its available resources (the number transmit antennas, transmit power, or coding rate). The probabilistic approach counters starvation by not allowing a flow to use all available resources for all time, thereby leaving a resource margin for other contending flows to initiate simultaneous transmissions. The present invention uses this framework to realize the first asynchronous MIMO MAC protocol that alleviates flow starvation.

In a preferred embodiment, the present invention is a method for enabling simultaneous and asynchronous transmissions in multi-antenna multi-hop random access networks. The method comprises the step of estimating available channel resources in a vicinity of a node by multi-bit quantization of the sensed channel resource usage. The network may employ a single antenna per device or a plurality of antennas per device or node. The estimating step may comprise the steps of determining a transmitter's residual capacity margin via multi-bit quantization of sensed channel resource usage, determining a receiver's residual capacity margin via multi-bit quantization of sensed channel resource usage, and estimating available channel resources in a vicinity of a flow using both the transmitter's residual capacity margin and the receiver's residual capacity margin. The residual capacity margin comprises a SINR margin. The method may further comprise the step of using the estimate of available channel resources to perform a mapping of measurements into node resource allocation decisions. The node resource allocation decisions may be deterministic and non greedy.

In another embodiment, the node resource allocation decisions are probabilistic. In such an embodiment, the method may further comprise the step of probabilistically mapping sensed residual capacity margin in the proximity of a sender-receiver pair to a number of transmit antennas, to a transmit power level, to a coding scheme/rate, or to a combination of those.

In another embodiment, the present invention is a system for enabling simultaneous and asynchronous transmissions The system comprises a multi-antenna multi-hop network comprising a plurality of nodes with each node having at least one antenna, and means for estimating available channel resources in a vicinity of a node by multi-bit quantization of the sensed channel resource usage. The means for estimating may comprise means for determining a transmitter's residual capacity margin via multi-bit quantization of sensed channel resource usage; means for determining a receiver's residual capacity margin via multi-bit quantization of sensed channel resource usage, and means for estimating available channel resources in a vicinity of a flow using both the transmitter's residual capacity margin and the receiver's residual capacity margin. The residual capacity margin may comprise a SINR margin. The system may further comprise means for using the estimate of available channel resources to perform a mapping of measurements into node resource allocation decisions. The node resource allocation decisions may be deterministic and non greedy.

In another embodiment, the node resource allocation decisions are probabilistic. The system may further comprise means for probabilistically mapping sensed residual capacity margin in the proximity of a sender-receiver pair to a number of transmit antennas, to a transmit power level, to a coding scheme/rate, or to a combination of those.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

The present invention provides a framework and protocol to (i) enable simultaneous and asynchronous transmissions in multi-antenna multi-hop networks and (ii) employ randomized and non-greedy resource allocation to counter starvation. The framework of the present invention defines a class of asynchronous random access protocols subsuming MIMO systems via the following two components.

Residual Capacity Estimation:

The first part of the framework is an interference measurement mechanism that estimates the current network conditions at both the transmitter and receiver. The residual capacity estimate is based on either or both of two ideas: (i) determination of the transmitter and receiver's residual SINR margin via multi-bit quantization of the sensed interference, which contrasts with carrier sensing, in which a binary transmission decision is made based on whether the sender's measured interference energy level is greater than a threshold; and (ii) because transmitters and receivers have different channel states, they share their residual capacity estimation information to make a joint decision. Hence, the transmission decision is appropriated for the available channel resources at both link endpoints irrespective of the surrounding topology.

Randomized Resource Allocation:

The second part of the framework is a decision making policy that uses the measured channel conditions to perform a mapping of measurements into node actions. The actions can be either deterministic or probabilistic (randomized). Deterministic actions imply a one-to-one mapping of measurements to actions (i.e. each sender-receiver measurement is mapped to a pre-determined number of antennas, power, or coding rate). In order to counter follow starvation, a deterministic map should not be greedy such that no flow exclusively captures all of available resources (e.g., a sender should not be allowed to transmit using all of its antennas). On the other hand, random actions counter inherent inaccuracies in the channel condition estimations (e.g., binary exponential backoff and information hiding). The invention applies randomization to the dimension of resource allocation not only to counter random estimation errors, but also to alleviate flow starvation. In particular, the invention maps a discretized transmitter-receiver measurement to a set of potential resource allocations. For example, a particular discretized sender-receiver measurement pair could map to a transmit antenna set such as use of {2, 3, or 4} antennas; likewise, if the allocated resource is transmit power, the measurement can map to a set of transmit power levels. The transmitter-receiver pair randomly selects a value within this set according to a pre-defined distribution.

The policies that map residual capacity estimation regions to resource usage sets and assign probabilities to each member of the set yield vastly different protocol behavior. For example, excluding the maximum number of antennas from all resource allocation sets yields a non-greedy policy that, coupled with random allocation of the number of transmit antennas, ensures that no flow consistently and greedily captures the channel, possibly starving other flows.

To realize the above framework in multi-antenna networks, we present an example protocol we refer to as the Asynchronous Randomized Allocation Multi-antenna medium access protocol, or "ARAM." The proposed antenna allocation mechanism maps the residual capacity estimate of the channel conditions to a randomized choice of the number of transmit antennas. The randomized mapping is a non-greedy policy that yields a sufficient SINR margin for previously-starving flows to initiate simultaneous communication if needed.

Thus, nodes that transmit do not use all available resources for all time, thereby leaving an opportunity for other flows to also transmit. Consequently, ARAM contrasts with existing protocols such as 802.11n that allow a single flow to repeatedly capture the medium, starving other flows in some topologies. Because the transmit power per antenna is fixed and the number of antennas varies in a preferred embodiment, this policy has the effect of potentially varying the transmit power per transmission. However, the transmission range per packet, and consequently per sender, is fixed regardless the number of used antennas or the type of the transmitted packet (i.e., data or control packets). This contrasts with power control in which the transmission range per packet or sender depends on the transmit power level and the packet type. Note that, power control is traditionally concerned with energy saving and spatial reuse maximization in ad-hoc networks. Conceptually, residual capacity estimation combined with non-greedy and randomized resource allocations can be extended to prevent flow starvation in single-antenna systems by means of joint rate and power control. For example, when a sender-receiver pair maps a residual capacity estimate to a lower rate combined with a low power level, the transmission range is fixed. However, the interference witnessed at competing flows will be less, and hence, simultaneous transmission can be initiated.

Finally, we describe an example randomized allocation policy for ARAM that maximizes the average transmission rate subject to employing a non-greedy randomized allocation strategy. To define this policy, we compute the achievable rates and outage probabilities for a transmission under asynchronous, multi-antenna, interferers. We use simulations to evaluate a number of ARAM policies compared against 802.11n-like systems.

I. System Model

In a preferred embodiment of the present invention, the systems is an asynchronous random access network in which each node is equipped with a single half-duplex wireless interface with N>1 antennas. To demonstrate the present invention, we consider single-hop flows in a multi-hop network topology (i.e., a topology in which all nodes are not mutually within range). The MIMO transceiver in the system is defined as follows: The transmitter of flow i uses a subset $n_i$ of its N antennas, with each antenna used for the transmission of a single independent stream or packet. The terms antenna and stream are used interchangeably in this description. The transmitted power per antenna (or packet), $P_{ant}$, and the stream rate, r, are fixed throughout the network, regardless the number of used antennas.

When acting as a receiver, a node uses all of its antennas. The N replicas of a transmitted stream are combined such that the received signal to interference plus noise ratio (SINR) at the output of the combiner is maximized. The receiver learns about the communication channel of its own transmitter via a training sequence for two purposes: (i) to null-out self interference from other streams transmitted from the same sender and (ii) to select the best antenna(s) to be used for data transmission. A feedback path is available to convey the selection information back to the transmitter. Such feedback overhead between a sender-receiver pair is significantly less than the overhead of estimating the channel information of all interferers and feeding it back to the transmitter for beamforming.

The aforementioned system model outlines the underlying multi-antenna physical layer. The optimal MIMO physical layer design is not known in the case of random access and asynchronous networks in which nodes have only incomplete information about inter-node channels in the network. Most information theoretic analysis for MIMO networks, e.g., S. Ye and R. Blum, "Optimized signaling for MIMO interference systems with feedback," *IEEE Transactions on Signal Processing*, vol. 51, pp. 2839-2848, November 2003 and R. Blum, "MIMO capacity with interference," *IEEE Journal on Selected Areas in Communications*, vol. 21, pp. 793-801, June 2003, assumes availability of significantly more channel information than we allow. For example, synchronized MIMO MAC protocols such as those cited above allow for a dedicated time slot, as shown in FIG. 1(a), in which only one sender sends a training sequence at a time so that receivers acquire the channel information of all interfering flows. This allows such protocols to eliminate the received interference.

II. Channel Model

In a preferred embodiment of the present invention, the received signal vector at the receiver of flow i is given by $$y_i = H_i x_i + \sum_{k=1}^{L-1} H_k x_k + n \quad (1)$$

where $H_i$ is the $N \times n_i$ fading channel matrix between the transmitter of flow i and flow i receiver, and $x_i$ is the $n_i \times 1$ signal sent by the transmitter of flow i. The $N \times 1$ vector n represents the additive white Gaussian noise with covariance matrix $E[nn^\dagger] = \sigma^2 I$, where $^\dagger$ denotes the conjugate transpose, $\sigma^2$ is the noise power, and I is the $N \times N$ identity matrix. Elements of the channel matrices and the noise vector are modeled as i.i.d. zero mean, circularly symmetric, complex Gaussian random variables. L is the total number of transmitters.

III. Framework and Protocol for Randomized Resource Allocation

As described in the description of related art, different nodes in multi-hop networks have different views of the channel state. Hence, the present invention has transmitter-receiver pairs collaborate to estimate the residual capacity in their vicinity via passive measurements, and use this information to choose their resource allocation actions. Moreover, the action is randomized to overcome the fact that the channel usage estimate is not accurate, and the action is non-greedy to prevent a flow from using all available resources. Consequently, other contending flows have an increased opportunity to simultaneously transmit.

A. Framework

The randomized resource allocation framework is based on two principles: Residual Capacity Estimation and Randomized Resource Allocation.

1) Residual Capacity Estimation

The first part of the framework is passive estimation of the available channel resources. Each node can listen to the on-going transmission activities in its vicinity and can measure the received accumulative energy of these transmissions. The received signal strength spectrum can be divided into multiple regions via multiple thresholds. Hence, nodes can make an appropriate transmission decision (e.g., a node chooses the appropriate transmission rate, power, or coding scheme in single antenna networks; or the number of transmit antennas in MIMO networks) based on the measured residual SINR margin. This contrasts with a binary decision based on a binary measurement as in protocols based on carrier sense.

Figure 2B:
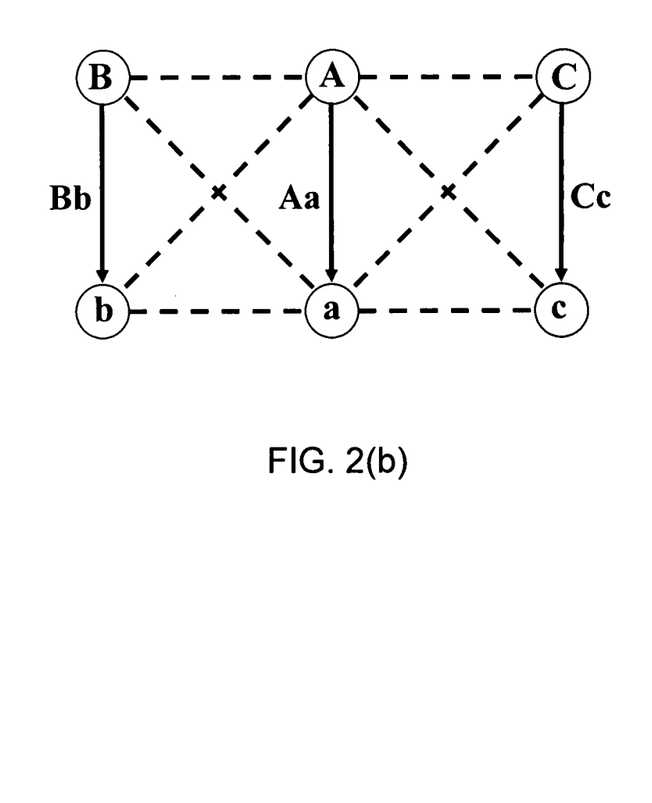

In multi-hop networks, the transmitter and receiver of a link have different views of the network resources as they are exposed to different spatial regions (e.g., see the network topologies in FIG. 2). Therefore, their individual estimates of the residual capacity can differ. The present invention jointly uses the transmitter-receiver estimates rather than simply using the transmitter's or the receiver's individual estimate. A transmitter-receiver pair subsequently share their multi-bit interference estimates to form a joint estimate of the region's conditions. An appropriated transmission decision is made based on the joint estimation of the available channel resources at both link endpoints irrespective of the surrounding topology. Hence, topology need not be explicitly known by the protocol.

2) Randomized Resource Allocation:

The second part of the protocol framework is the decision making policy based on the measured capacity margin in the flow's vicinity. The SINR estimates are based on a finite measurement window. Moreover, longer measurement windows are not necessarily useful since the environment is dynamic and the interference is modulated both by bursty traffic, asynchronous initiation and termination of packet transmissions, and channel fading. A preferred embodiment of the present invention uses a randomized mapping from measurements to transmission actions to counter such inherent inaccuracies in the measurements. Namely, the randomized mapping handles random estimation errors with randomized allocations.

To implement this randomization in resource allocation, the present invention maps the measured residual capacity estimation into a set of transmission actions. Each element in that set (e.g., a certain number of antennas, rate, or power level) is associated with a certain probability. Therefore, nodes do not always take the same action for the same measurement. This ensures that nodes are neither consistently greedy nor consistently starving in their choices.

In contrast, 802.11-like resource allocation strategies are deterministic and do not account for inaccuracies in estimating interference. Namely, if a carrier-sensing 802.11 node infers that the interference is below a specific threshold, it transmits at full power with probability 1, i.e., its strategy is deterministic and greedy. However, carrier sense does not provide a complete picture of the channel and resource allocation based on incomplete information leads to starvation or poor fairness characteristics.

Regardless, the idea of using randomization to deal with random noise (due to channel fading, source burstiness or channel errors) is commonly used in both network protocol design and information theory. For example, random backoff is a randomizing node action designed to account for the lack of precise information about other transmitters' queue state, the number of active nodes in the network, etc. Likewise, information-theoretic analysis of jamming channels relies on randomness to increase network capacity, which is again randomizing a node's actions to counter random actions of a jammer (see P. Moulin and J. A. O'Sullivan, "Information-theoretic analysis of information hiding," IEEE Transactions on Information Theory, vol. 49, no. 3, 2003). In contrast, the present invention applies randomization to the dimension of resource allocation not only to counter random estimation errors but also to alleviate flow starvation.

A key challenge in designing randomized mappings is the choice of the actions and their corresponding probabilities. A preferred embodiment of the present invention uses nongreedy policies such that no flow exclusively captures the available channel resources. The main effect of such a randomized mapping is that the interference observed by other contending flows is lower when reduced resources (number of antennas and/or transmit power) are chosen by the current flow. Consequently, an SINR margin remains for other flows to initiate simultaneous communication if needed. Thus, nodes that choose to transmit do not use all available resources for all time, thereby leaving an opportunity for other flows to transmit.

B. Protocol

The protocol of a preferred embodiment of the present invention is referred to as Asynchronous Randomized Allocation Multi-antenna (ARAM). ARAM is a random access protocol that exploits residual capacity estimation and antenna selection to implement the randomized resource allocation framework in MIMO networks. ARAM utilizes a four-way handshake access mechanism. A transmitter precedes data packet transmission with a request packet that contains training sequences (sent from each antenna one at a time) to aid the intended receiver in estimating its channel matrix. The request packet includes the multi-bit quantization of the measured interference at the sender. The receiver responds with the number and identity of the selected antennas in a grant packet. Finally, data transmission takes place followed by an acknowledgment. The request, grant and ACK packets are sent over a single antenna.

Unlike legacy RTS/CTS handshaking, request/grant handshaking does not exclusively reserve the medium, as non-greedy randomized resource allocation allows for multiple simultaneous transmissions. Instead, the request and grant packets are used to exchange residual capacity estimations and antenna allocation and selection information between the sender and its receiver. The main components of the ARAM protocol are:

Residual Capacity Estimation (RCE):

ARAM employs two received signal strength indicator (RSSI) thresholds: $T_1$ that corresponds to the minimum detectable power of a single antenna, and $T_N = NT_1$ that represents the minimum power received from N interfering antennas. Note that the value of $T_N$ is analogous to the binary carrier sensing threshold in IEEE 802.11n networks. Before making the decision regarding the number of transmit antennas $n_i$, the receiver needs to know the available capacity margin at its transmitter's vicinity. Therefore, each transmitter communicates to its intended receiver its own RCE region (whether below $T_1$, above $T_N$ or in between $T_1$ and $T_N$) via 2 bits in the request packet.

Randomized Antenna Allocation:

RCE estimates the amount of interference at both link endpoints. Using the RCE information, the receiver then decides how many antennas the sender should use. If information such as network topology, the number of interfering flows, and the number of used antennas per interfering flow is explicitly known, the ideal number of antennas that could be used for the current transmission can be calculated using standard network utility maximization techniques. See F. Kelly, A. Maulloo, and D. Tan, "The rate control for communication networks: shadow prices, proportional fairness and stability," *Journal of the Operational Research Society*, vol. 409, pp. 237-252, 1998. Probabilistic antenna allocation overcomes the need for such information in asynchronous distributed networks. The number of used antennas and the corresponding probabilities can be chosen to realize different objectives. A preferred embodiment of the present invention uses the following scheme, which targets the highest fair throughput in the system (we defer the analysis of this scheme to Section IV).

With RCE information of both the transmitter and the receiver, 3 operation regions can be identified: both RCE (TX) and RCE(RX) are below $T_1$; either RCE(TX) or RCE(RX) are above $T_N$; or all other combinations of RCE (TX) and RCE(RX). In the first region, a flow can use all of its antennas as there is no significant interference at both its endpoints; however, the ARAM receiver decides to allow its transmitter to use all of its N antennas only with a certain probability $p_N$. Otherwise, the receiver chooses to have the sender use $\hat{N}<N$ antennas with probability $1-p_N$. $\hat{N}$ and $p_N$ govern the fairness-throughput of the protocol. Small $\hat{N}$ (and/or $p_N$) gives more SINR margin for other contending flows. On the other hand, small $\hat{N}$ degrades the throughput performance of the system. This probabilistic allocation prevents a flow from greedily dominating the medium irrespective of the topology. The residual capacity margin is the key idea by which the ARAM protocol counters starvation so that other (possibly starving) flows can use this capacity margin to transmit some streams. Then, the ARAM protocol will work to achieve fairness among flows since each flow will adapt its transmission strategy according to the changes in the interference level.

In the second RCE region of strong interference at either the sender or the receiver, transmitting a large number of streams can result in collision with the on-going transmissions. Therefore, the receiver decides either to have the sender use a single antenna with probability $1-p_0$ or to not let the sender transmit with probability $p_0$. In the latter case, the transmitter defers and re-measures the medium after a random backoff duration. Finally, for all other combinations of RCE(TX) and RCE(RX), the receiver chooses to use 1 or N antennas with probabilities $p_1$ and $1-p_1$, respectively. The probabilistic allocation approach in the above two ARAM operation regions targets to balance the successful transmission opportunities while not degrading the throughput in interference-prone scenarios. Algorithm 1 depicts the ARAM probabilistic antenna allocation procedure.

---

Algorithm 1 ARAM Probabilistic Antenna Allocation

---

1. if $RCE(TX) < T_1$ and $RCE(RX) < T_1$
2.     $n_i = \hat{N}$ with probability $1 - p_N$;
3.     $n_i = N$ with probability $p_N$;
4. else if max $(RCE(TX), RCE(RX)) \geq T_N$
5.     $n_i = 0$ with probability $p_0$;
6.     $n_i = 1$ with probability $1 - p_0$;
7. else
8.     $n_i = 1$ with probability $p_1$;
9.     $n_i = N$ with probability $1 - p_1$;

---

Single-Link Antenna Selection:

After determining the number of antennas to be used, $n_i$, the receiver selects the best $n_i$ antennas of the transmitter's antennas using the channel information learned via the training symbols in the request packet. In ARAM, the receiver uses an exhaustive search algorithm to select the best transmit antennas. Since typical values of N are relatively small, the computational complexity of exhaustive search is limited. The receiver informs its sender the number and identity of the selected antennas via an antenna mask of length N bits.

Figure 1C:
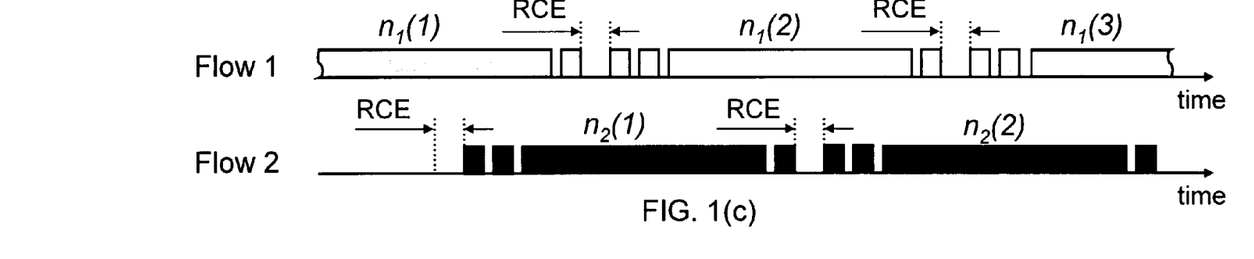

Data Transmission/Acknowledgment:

Upon receiving the grant packet, the transmitter sends $n_i$ different equal-sized data packets over the selected antenna(s). This is more efficient than sending a single packet at $n_i$ times the single antenna rate as, in ARAM, the control overhead is shared for multiple packets. Another consequence is that, for a given packet size, data transmission time will be fixed regardless of the number of used antennas. The receiver acknowledges the correct reception of individual packets in order to minimize the retransmission overhead. If no acknowledgement was received, he transmitter runs the binary exponential backoff procedure. FIG. 1(c) depicts the timeline of two contending flows using the proposed ARAM protocol.

IV. Randomized Allocation Policy

Recall that ARAM maps measurements of residual capacity to a resource set, with an element of the set chosen according to a pre-defined probability distribution. In this section, we compute the resource set and the corresponding distribution that maximizes the average rate for two contending transmissions with random interference.

We first calculate the achievable flow rates in asynchronous MIMO networks. Since neither the transmitter nor receiver can have complete channel information of all interfering transmitters, we cannot use the same interference channel analysis of S. Ye and R. Blum, "Optimized signaling for MIMO interference systems with feedback," *IEEE Transactions on Signal Processing*, vol. 51, pp. 2839-2848, November 2003 and R. Blum, "MIMO capacity with interference," *IEEE Journal on Selected Areas in Communications*, vol. 21, pp. 793-801, June 2003. Our technique is to use the outage probability analysis to calculate the achievable rates.

A. Achievable Rates and Outage in Asynchronous Networks

According to our network model, transmission i consists of $n_i$ independent data streams, each representing a packet, and each is transmitted with rate r. The probability of successfully transmitting a single stream with rate r is one minus the outage probability. Due to the independence of the streams sent by different antennas, the achievable rate of transmission i is $$R_i = n_i r(1-p_{out})^{n_i} \quad (2)$$

The information-theoretic outage probability of a randomly selected antenna is defined to be the probability of the event that the mutual information I(SINR) falls below a specific transmission rate r, i.e., $$p_{out} = \text{Prob}[I(SINR) < r] \quad (3)$$

For our considered diversity scheme, the mutual information per stream is given by $$I(SINR) = \frac{1}{N} \log_2 I(1 + SINR) \quad (4)$$

The received SINR of the $n^{th}$ stream at the output of the maximal ratio combiner is given by $$SINR = \frac{\sum_{m=1}^{N} P_i |h_{nm}^i|^2}{\sum_{k=1}^{L-1} \sum_{l=1}^{n_k} \sum_{m=1}^{N} P_k |h_{lm}^k|^2 + \sigma^2} \quad (5)$$

where $P_i$ is the received signal power from node i per antenna, and $P_k$ is the received interference power from node k per antenna.

We define the following three terms to describe the output of the maximal ratio combiner: $\gamma_{nm}^i = |h_{nm}^i|^2$, where $h_{nm}^i$ is the channel fading coefficient between the $n^{th}$ transmit antenna of node i and the $m^{th}$ receive antenna;

$$\gamma_n^i = \sum_{m=1}^{N} \gamma_{nm}^i = \sum_{m=1}^{N} |h_{nm}^i|^2$$

as the effective SIMO channel of the $n^{th}$ transmit antenna of link i at the output of the combiner; and $$\gamma^k = \sum_{l=1}^{n_k} \gamma_n^k$$

as the effective interference from node k at the combiner output. Hence, (5) can be rewritten as $$SINR = \frac{SNR \gamma_n^i}{\sum_{k=1}^{L-1} INR_k \gamma^k + 1} \quad (6)$$

where SNR and $INR_k$ are the mean signal to noise ratio per antenna and the mean interference to noise ratio per antenna received from node k, respectively. SNR and $INR_k$ depend on $\sigma^2$, $P_{ant}$, antenna heights, the propagation environment, and the inter-node distances.

A set of concurrent transmissions can be characterized via a set of SNR and INR values. For ease of notation, we denote $\gamma = \gamma_n^i$ and $$\tilde{\gamma} = \sum_{k=1}^{L-1} \gamma^k,$$

and assume equal INR for all interfering transmissions. Substituting (6) and (4) in (3), the outage probability can be expressed as $$p_{out} = \text{Prob}\left[\frac{\gamma}{\tilde{\gamma} + \frac{1}{INR}} < (2^{Nr} - 1)\frac{INR}{SNR}\right] \quad (7)$$

In order to evaluate (7), we need to find the probability distribution functions of $\gamma$ and $\tilde{\gamma}$. Since we assume the channel fading coefficients are normally distributed, $\gamma_{nm}^i$ is exponentially distributed. The Chi-squared ($\chi_m^2$) distribution with m degrees of freedom nominally applies to the sum of m i.i.d. exponential random variables. The sum of i.i.d. Chi-squared random variables has a Chi-squared distribution with degrees of freedom equal to the sum of the degrees of freedoms of the i.i.d. random variables. Since the channel fading coefficients are i.i.d., $\gamma$ and $\tilde{\gamma}$ are Chi-squared distributed with 2N and $$2\tilde{M} = 2\sum_{k=1}^{L-1} n_k N$$

degrees of freedom, respectively.

Thus, the outage probability in (7) is calculated as $$p_{out} = \int_0^\infty f_{\tilde{\gamma}}(\tilde{\gamma}) \int_0^{A(\tilde{\gamma}+\frac{1}{INR})} f_\gamma(\gamma) d\gamma d\tilde{\gamma} \qquad (8)$$

where $$a = (2^{Nr} - 1)\frac{INR}{SNR}.$$

For (8), we first evaluate the inner Integral $$\int_0^{A(\tilde{\gamma}+\frac{1}{INR})} f_\gamma(\gamma) d\gamma = \frac{1}{\Gamma(N)} \int_0^{A(\tilde{\gamma}+\frac{1}{INR})} \gamma^{N-1} e^{-\gamma} d\gamma \qquad (9)$$

$$= \frac{(N-1)!}{\Gamma(N)} \left[ 1 - e^{-A(\tilde{\gamma}+\frac{1}{INR})} \sum_{s=0}^{N-1} \frac{\left(A\left(\tilde{\gamma}+\frac{1}{INR}\right)\right)^s}{s!} \right] \qquad (10)$$

Then, we calculate the outer integral noting that $\Gamma(N) = (N-1)!$ for integer valued N. We have $$p_{out} = \frac{1}{\Gamma(\tilde{M})} \left[ \int_0^\infty \tilde{\gamma}^{\tilde{M}-1} e^{-\tilde{\gamma}} d\tilde{\gamma} - \sum_{s=0}^{N-1} \frac{A^s}{s!} \times \int_0^\infty \tilde{\gamma}^{\tilde{M}-1} \left(\tilde{\gamma}+\frac{1}{INR}\right)^s e^{-\tilde{\gamma}} e^{-A(\tilde{\gamma}+\frac{1}{INR})} d\tilde{\gamma} \right] \qquad (11)$$

$$= 1 - \frac{e^{\frac{-A}{INR}}}{\Gamma(\tilde{M})} \sum_{s=0}^{N-1} \frac{A^s}{s!} \int_0^\infty \tilde{\gamma}^{\tilde{M}-1} \left(\tilde{\gamma}+\frac{1}{INR}\right)^s e^{-\tilde{\gamma}(1+A)} d\tilde{\gamma} \qquad (12)$$

Unfortunately, the integral in (12) is intractable. However, we can asymptotically evaluate upper and lower bounds of $p_{out}$ for interference-limited and noise-limited networks, respectively. We only report the upper bound as our network is an interference-limited one.

Interference-Limited Upper Bound:

For interference limited networks where the interference power is much higher than the noise power (i.e., INR>>1), the intractable integral in (12) is reduced to a tractable one that equals $(s+\tilde{M}-1)/(1+A)^{s+\tilde{M}}$. If the signal to noise ratio is finite, A goes to infinity for infinite INR. In this weak signal to interference scenario, we have certain outage ($p_{out} \to 1$ almost surely). On the other hand, if the SNR is in the same order of the INR such that $$\frac{SNR}{INR}$$

is finite, we have $$e^{-\frac{A}{INR}} = 1$$

and hence (12) is equal to $$p_{out}^u = 1 - \frac{1}{\Gamma(\tilde{M})(1+A)^{\tilde{M}}} \sum_{s=0}^{N-1} \left(\frac{A}{1+A}\right)^s \frac{(s+\tilde{M}-1)!}{s!} \qquad (13)$$

Thus, the outage probability, and hence, the achievable rates are functions of the stream rate r, the signal to interference ratio $$\frac{SNR}{INR},$$

and the number of interfering antennas $n_k$ for all interfering transmitters modeled by $\tilde{M}$.

Substituting with (13) in (2), the achievable rates can be calculated. It is worth noting that if the set of contending transmissions and their SNR and INR values are known a priori, standard network utility maximization can be used to determine the ideal number of antennas $n_i$ per transmission. However, realizing such allocation requires a distributed mechanism to identify the set of contending transmissions, measure their SNR and INR values, and coordinate resource allocation among the transmissions.

B. Distributions for Random Transmission Sets

We next present an example of a technique to select the ARAM protocol's parameter values for a random interferer. The parameters consist of $p_0$, $p_1$, $p_N$ and $\hat{N}$. Recall that the sender-receiver RCE quantization maps to a resource set of $\{0, 1, \hat{N}, N\}$ antennas. Members of the resource set can have different allocation probabilities in different RCE regions.

The mean rate of transmission i for a random contender, $\bar{R}_i$, is the weighted sum of the rates achieved using all possible values of $n_i$ for all RCE decision regions, i.e., $$\bar{R}_i = \sum_{RCE} R_{n_i|RCE} \text{Prob}[RCE] \qquad (14)$$

where Prob[RCE] is the probability of a given quantized residual capacity estimation. RCE is based on two factors: the relative node locations and the antenna allocations of other transmitters in the network.

One way to calculate Prob[RCE] is to consider a single random interferer. In this case, the probability of each of the possible RCE events depends on the antenna allocation probability of only one other transmitter. Thus, the mean transmission rate in (14) can be rewritten as $$\bar{R}_i = (R_{N|0} + R_{\hat{N}|0})p_0 + (R_{1|1} + R_{N|1})(p_1 + (1-p_0)) + \qquad (15)$$
$$(R_{1|\hat{N}} + R_{N|\hat{N}})(1-p_N) + R_{1|N}(p_N + (1-p_1))$$

where $R_{n_i|n_j}$ is the achievable rate of transmission i using $n_i$ antennas given that the interfering transmission is using $n_j$ antennas calculated using (13) and (2).

Under a unit disk transmission model and randomly placed transmitters and receivers, (15) can be used with the probabilities, $p_{top}$, of different combinations of interfering pairs of transmissions in a random topology as computed in:

$$R_{avg} = \sum_{top} \frac{(\bar{R}_{Aa|top} + \bar{R}_{Bb|top})}{2} p_{top} \quad (16)$$

For each integer value of $\hat{N}<N$, we calculate $p_0$, $p_1$, and $p_N$ that maximize (16) such that $0 \leq p_0, p_1, p_N \leq 1$.

V. Simulation Results

We develop a discrete-time event-driven network simulator using Matlab using the parameter values used to implement the 802.11 protocol in ns-2 simulator listed in Table I.

TABLE 1

PHYSICAL AND MAC LAYER PARAMETERS.

| Parameter | Value |
|---|---|
| Node TX power | 0.2818 W (24 dBm) |
| Channel BW | 20 MHz |
| Packet size | 1000 bytes |
| Single antenna rate | 2 Mbps |
| PLCP length | 192 bits @ 1 Mbps |
| (R, G, ACK, Data) header | (20, 14, 14, 28) bytes |
| (DIFS, SIFS, Mini-Slot) | (25, 16, 20) μsec |
| ($CW_{min}$, $CW_{max}$) | (31, 1023) |

Each node is equipped with 4 antennas. We assume backlogged UDP flows with non-empty transmit queues. We present ARAM protocol results for $\hat{N}=3$ and 2 to illustrate the impact of $\hat{N}$ on the throughput-fairness tradeoff. We calculate the values of $p_0$, $p_1$, and $p_N$ as shown in Section IV. We also tuned the ARAM probabilities to realize a conservative allocation policy in which a sender uses only a single antenna. We refer to this allocation as the ARAM(PF) policy, as it achieves proportional fairness in all two-flow topologies if network utility maximization is used. Our benchmark is an 802.11n protocol which uses N antennas to increase the data rates. In our 802.11n implementation, we transmit N packets per channel access in order to combat the throughput inefficiency resulting from the transmission of control packets at the base rate. We label this protocol as CSMA/CA(N). $T_N$ in the ARAM RCE is calculated to equal the CSMA/CA(N) carrier sensing threshold corresponding to distance of 250 m. These results are the average of 20 simulations of length 30 seconds.

Figure 5A:
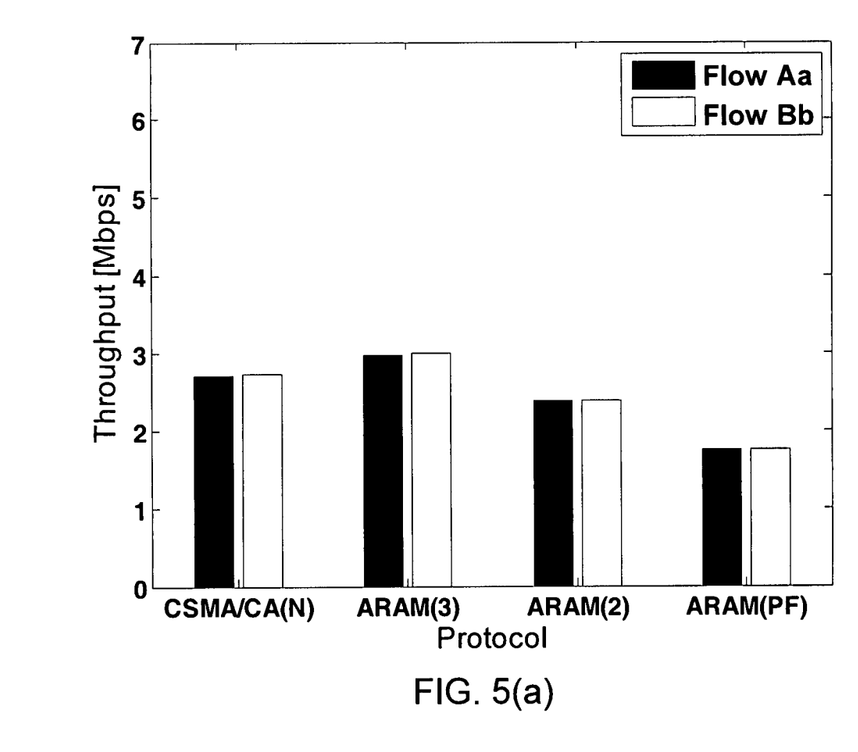
FIG. 5 illustrates flow throughput of example two-flow scenarios under different MAC approaches. In topology (a), $d_{Ab}=d_{aB}=250$ m. In topology (b), $d_{Ab}=d_{aB}=2d_{AB}=500$ m. In topology (c), $d_{Ab}=2d_{aB}=500$ m, hence, link Aa receives only 2.7 Kbps in CSMA/CA(N) networks.

Symmetric Interference Scenarios: FIG. 5(a) depicts the throughput distribution of 2 flows with symmetric interference effect on one another. Since both senders are in range, CSMA/CA(N) enables both flows to fairly alternate capturing the channel. On the other hand, the ARAM protocol allows both flows to be simultaneously active each using a certain number of antennas according to the interference received from the other flow. CSMA/CA(N) achieves higher throughput than ARAM for values of $\hat{N}$ less than N/2 (since CSMA/CA(N) flows alternate using 0 and N antennas, N=2 antennas are used in average; moreover, the outage probability for CSMA/CA(N) is almost zero). As $\hat{N}$ exceeds N=2, ARAM throughput outperforms CSMA/CA(N) as for ARAM(3).

Figure 5B:
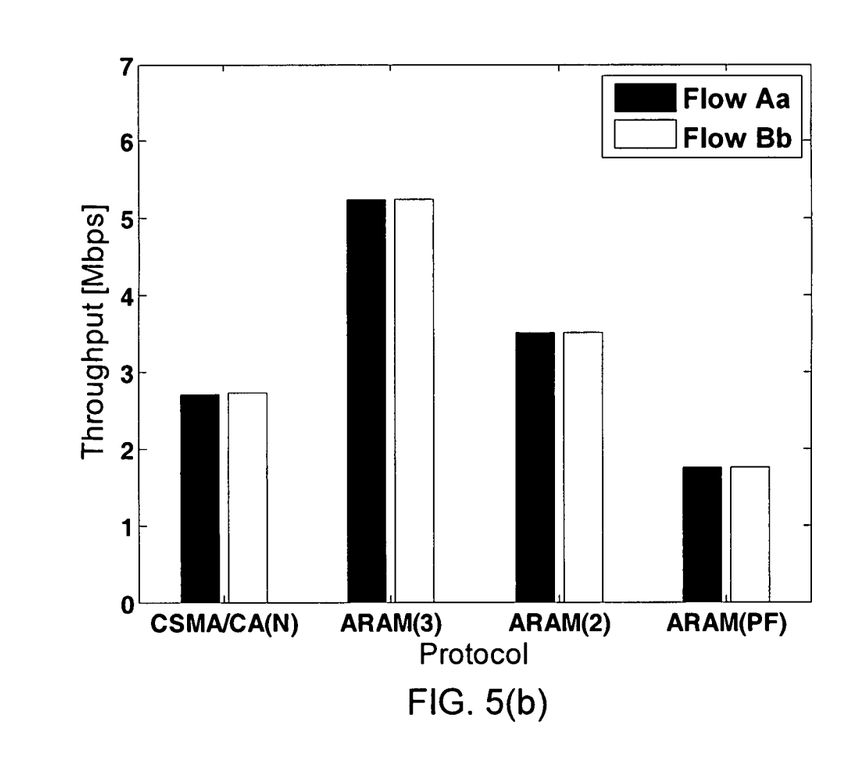

Interference-Free Scenarios: Next, we consider the case in which the senders of the two flows are in proximity of each other while the interfered receivers are located at far distance (similar results were obtained when sender-receiver roles are switched). Both CSMA/CA(N) and the ARAM(PF) protocol achieve the same throughput as in the symmetric interference scenario as shown in FIG. 5(b). In contrast, ARAM($\hat{N}$) yields both flows to alternate using $\hat{N}$ or N antennas. Hence, it achieves higher throughput compared to CSMA/CA(N).

Figure 5C:
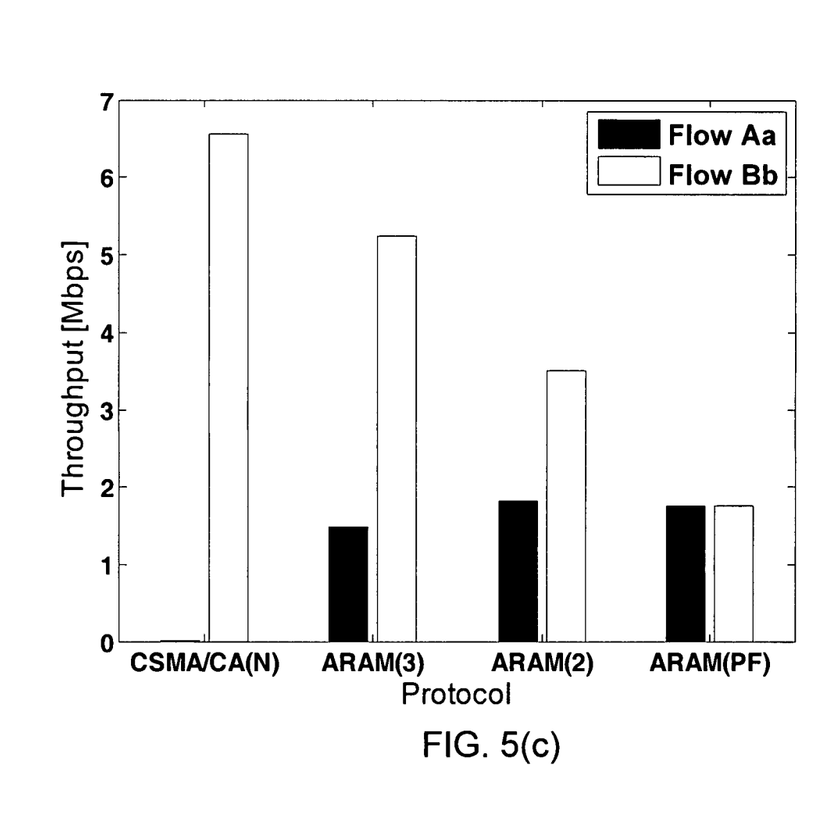

Asymmetric Interference Scenarios: The ARAM non-greedy policy alleviates the severe unfairness in throughput shares in the problematic information asymmetry scenario shown in FIG. 2(a). Note that flow Aa receives only 2.7 Kbps with CSMA/CA(N). However, the superior ARAM fairness comes at the expense of low throughput as shown in FIG. 5(c). The choice of $\hat{N}$ controls the throughput-fairness tradeoff of the ARAM protocol: using $\hat{N}=2$ achieves 21.5% lower aggregate throughput than $\hat{N}=3$, however, the disadvantaged flow obtains 51% (rather than receiving only 27%) of the advantaged flow throughput. It is the network designer's decision to choose $\hat{N}$ to reflect the throughput-fairness requirements.

Figure 6:
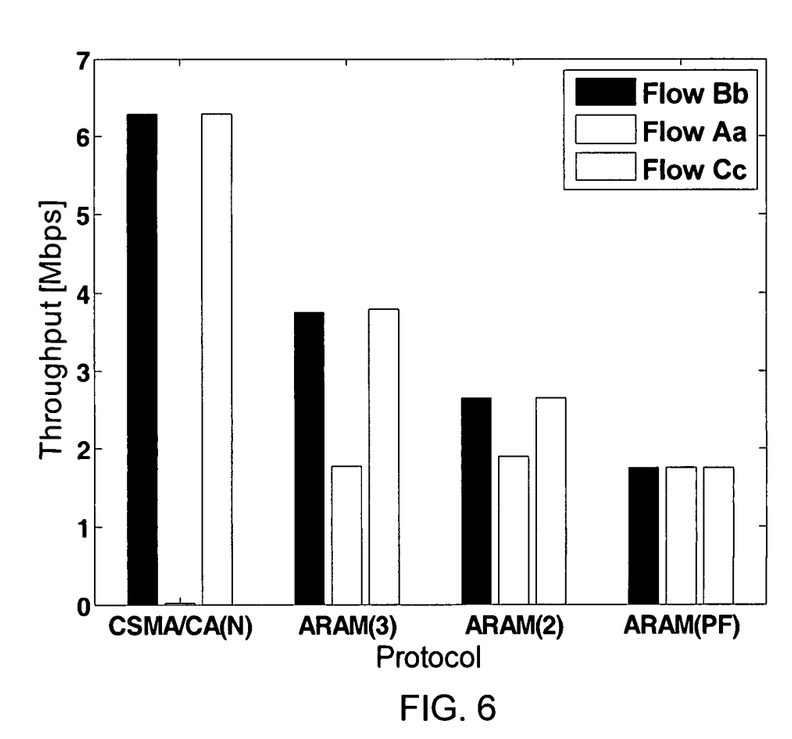
FIG. 6 illustrates flow throughput of flow in the middle (FIM) scenario under different MAC approaches. The distance between a transmitter and receiver of the immediate neighboring flow is 250 m. Link Aa receives only 4.7 Kbps with CSMA/CA(N).

Flow in the Middle Scenario: We use this example network to show that the ARAM protocol capability to prevent flow starvation is not restricted to two-flow topologies. ARAM alleviates the severe unfairness in the throughput of flow Aa as depicted in FIG. 6. Similarly, $\hat{N}$ governs the throughput fairness tradeoff. For the conservative single antenna PF policy, each flow achieves 84% of the theoretical fair throughput in CSMA/CA(N) (one third of the link capacity).

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for enabling simultaneous and asynchronous transmissions in multi-antenna multi-hop random access networks comprising the steps of:
   estimating available channel resources in a vicinity of a node by multi-bit quantization of a sensed channel resource usage using both a residual capacity margin of a transmitter and a residual capacity margin of a receiver; and
   mapping estimates of available channel resources into a set of transmission actions, said transmission actions comprising a number of antennas, a transmission rate and a power level, wherein each transmission action in the set is associated with a probability that prevents said node from always taking a particular action in response to a particular measurement, wherein node resource allocation decisions are allocated according to a probability distribution, said node resource allocation decisions comprising a number of transmit antennas, a transmit power level, and a coding scheme/rate; and
   wherein said allocation does not allow any flow to exclusively capture all available resources, thereby leaving a resource margin for other contending flows to initiate simultaneous transmissions.

2. The method according to claim 1, wherein said network employs a single antenna per device.

3. The method according to claim 1 wherein said estimating step comprises the steps of:
  determining the transmitter's residual capacity margin via multi-bit quantization of sensed resource usage;
  determining the receiver's residual capacity margin via multi-bit quantization of sensed resource usage; and
  estimating available channel resources in a vicinity of a transmitter-receiver pair using both said transmitter's residual capacity margin and said receiver's residual capacity margin.

4. The method according to claim 3, wherein said residual capacity margin comprises a SINK margin.

5. The method according to claim 3, wherein said network employs a single antenna per device.

6. The method according to claim 1, further comprising the step of initiating a transmission based upon said mapping, wherein one or more neighboring nodes are transmitting data at the time said transmission is initiated.

7. The method according to claim 1 wherein said node resource allocation decisions are deterministic and non greedy.

8. The method according to claim 1 wherein said node resource allocation decisions are probabilistic.

9. The method according to claim 8 further comprising the step of probabilistically mapping sensed residual capacity margin in the proximity of a sender-receiver pair to the number of transmit antennas.

10. The method according to claim 8 further comprising the step of probabilistically mapping sensed residual capacity margin in the proximity of a sender-receiver pair to a number of transmit antennas and a transmit power level.

11. The method according to claim 8 further comprising the step of probabilistically mapping sensed residual capacity margin in the proximity of a sender-receiver pair to the number of transmit antennas and the coding scheme/rate.

12. The method according to claim 8 further comprising the step of probabilistically mapping sensed residual capacity margin in the proximity of a sender-receiver pair to the number of transmit antennas, the transmit power level and the coding scheme/rate.

13. The method according to claim 5, further comprising the step of using said estimate of available channel resources to perform a mapping of measurements into node resource allocation decisions in single antenna networks.

14. The method according to claim 5 wherein said node resource allocation decisions in single antenna networks are deterministic and non greedy.

15. The method according to claim 5 wherein said node resource allocation decisions in single antenna networks are probabilistic.

16. The method according to claim 14 further comprising the step of probabilistically mapping sensed residual capacity margin in the proximity of a sender-receiver pair to the coding/scheme rate and the transmit power level.

17. A system for enabling simultaneous and asynchronous transmissions comprising:
  a multi-antenna multi-hop random access network comprising a plurality of nodes; and
  means for estimating available channel resources in a vicinity of a node by multi-bit quantization of a sensed channel resource usage using both a residual capacity margin of a transmitter and a residual capacity margin of a receiver;
  means for mapping estimates of available channel resources into a set of transmission actions, said transmission actions comprising a number of antennas, a transmission rate and a power level, wherein each transmission action in the set is associated with a probability that prevents said node from always taking a particular action in response to a particular measurement, and wherein to perform node resource allocation decisions using said estimate of available channel resources, wherein a number of transmit antennas, a transmit power level, and a coding scheme/rate are allocated according to a probability distribution; and
  means for prohibiting any flow from exclusively using all available resources, thereby leaving a resource margin for other contending flows to initiate simultaneous transmissions.

18. The system according to claim 17, wherein the node comprises a single antenna.

19. The system according to claim 17 wherein said means for estimating comprises:
  means for determining the transmitter's residual capacity margin via multi-bit quantization of sensed resource usage;
  means for determining the receiver's residual capacity margin via multi-bit quantization of sensed resource usage;
  means for estimating available channel resources in a vicinity of a flow using both said transmitter's residual capacity margin and said receiver's residual capacity margin; and
  means for prohibiting any flow from exclusively using all available resources, thereby leaving a resource margin for other contending flows to initiate simultaneous transmissions.

20. The system according to claim 19, wherein said residual capacity margin comprises a SINK margin.

21. The system according to claim 19 wherein said node resource allocation decisions are deterministic and non greedy.

22. The system according to claim 19 wherein said node resource allocation decisions are probabilistic.

23. The system according to claim 22 further comprising means for probabilistically mapping sensed interference in the proximity of a sender-receiver pair to the number of transmit antennas.

24. The system according to claim 22 further comprising means for probabilistically mapping sensed interference in the proximity of a sender-receiver pair to the number of transmit antennas and the transmit power level.

25. The system according to claim 22 further comprising means for probabilistically mapping sensed interference in the proximity of a sender-receiver pair to the number of transmit antennas and the coding scheme/rate.

26. The system according to claim 22 further comprising means for probabilistically mapping sensed interference in the proximity of a sender-receiver pair to the number of transmit antennas, the transmit power level, and the coding scheme/rate.

* * * * *